(12) United States Patent
Orzel et al.

(10) Patent No.: US 6,581,371 B1
(45) Date of Patent: Jun. 24, 2003

(54) ENGINE CATALYST MONITOR

(75) Inventors: Daniel V Orzel, Westland, MI (US); Michael James Uhrich, Sylvan Lake, MI (US); Theodore Michael Kostek, Layfayette, IN (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/079,351

(22) Filed: Feb. 20, 2002

(51) Int. Cl.[7] .............................. F01N 3/00
(52) U.S. Cl. .................. 60/277; 60/274; 60/276
(58) Field of Search .................. 60/274, 276, 277; 73/23.31, 23.32, 118.1

(56) References Cited

U.S. PATENT DOCUMENTS

| | | | |
|---|---|---|---|
| 4,622,809 A | * 11/1986 | Abthoff et al. | 60/274 |
| 5,228,335 A | * 7/1993 | Clemmens et al. | 73/118.1 |
| 5,237,818 A | * 8/1993 | Ishii et al. | 60/277 |
| 5,255,515 A | * 10/1993 | Blumenstock et al. | 60/277 |
| 5,319,921 A | * 6/1994 | Gopp | 60/277 |
| 5,341,642 A | 8/1994 | Kurihara et al. | |
| 5,431,011 A | * 7/1995 | Casarella et al. | 60/274 |
| 5,627,757 A | * 5/1997 | Comignaghi et al. | 60/277 |
| 5,715,678 A | * 2/1998 | Aronica et al. | 60/277 |
| 5,802,843 A | 9/1998 | Kuihara et al. | |
| 5,819,530 A | 10/1998 | Asano et al. | |
| 6,050,087 A | 4/2000 | Kurihara et al. | |

* cited by examiner

*Primary Examiner*—Thomas Denion
*Assistant Examiner*—Tu M. Nguyen

(57) ABSTRACT

A method for determining a condition of a catalyst disposed in an exhaust of an engine. The method includes sensing a common property of both the exhaust upstream and downstream of the catalyst; taking samples of such upstream and downstream sensed property over a period of time; accumulating the samples over the period of time; determining statistical characteristics of the sensed common property of the upstream and downstream common property; comparing the determined statistical characteristics of the sensed upstream property with the determined statistical characteristics of the downstream property to determine whether catalyst was in a proper operating condition during such period of time. With such method statistical characteristics are determined from samples as they are obtained and then once obtained, processed to determine the condition of the catalyst. Such method thereby reduces memory or data storage requirements and also reduces computational requirements.

5 Claims, 4 Drawing Sheets

ENGINE CATALYST MONITOR

RELATED APPLICATIONS

This application relates to co-pending patent application Ser. No. 09/828,020 filed Apr. 7, 2001, assigned to the same assignee as the present patent application, the entire subject matter thereof being incorporated herein by reference.

TECHNICAL FIELD

This invention relates to engine catalyst monitoring system and methods.

BACKGROUND

As is known in the art, Government regulations place strict emissions standards on automobiles. Furthermore, to ensure low emissions throughout vehicle life, automobiles must be self-diagnosing; i.e., failures in any emissions related component must be reported to the driver by illuminating a malfunction indicator light (MIL), for example. The catalytic converter (herein referred to as the catalyst), being one of the most critical emission control components on an automobile, falls under these rules. The ability of the catalyst to convert emissions into benign compounds must be monitored during engine operation.

Traditionally, three way catalysts (TWCs) are diagnosed based on oxygen storage since it correlates with hydrocarbon (HC) and $NO_x$, conversion efficiency. To measure oxygen storage, oxygen sensors are used to detect the oxygen concentration upstream and downstream of the catalyst. By analyzing the differences in the upstream and downstream concentrations of oxygen, the oxygen storage of the catalyst, and therefore its conversion efficiency, can be inferred.

A variety of methods have been developed and patented to analyze the oxygen sensor signals for catalyst diagnosis. Features of the sensor signals are converted into metrics, and diagnosis is performed using these metrics. Some metrics include number of rich/lean switches, amplitudes, slopes, length of line, and step responses. As vehicle emissions levels proceed from Low Emission Vehicle (LEV) to Ultra-low Emission Vehicle (ULEV) to Super Ultr-Low Emission Vehicle/Partial Zero Emission Vehicle (SULEV/PZEV), however, all these metrics have increased difficulty distinguishing between good and failed TWCs, leading to unnecessary warranty costs. Furthermore, new types of TWC materials and designs—conditioning catalysts and low oxygen storage catalysts, for example—create challenges for existing catalyst monitor techniques.

In summary, the automotive industry faces the problem of diagnosing new types of catalysts with more accuracy using modest computing resources and new technology has been created to meet this challenge.

SUMMARY

In accordance with the present invention, a method is provided for determining a condition of a catalyst disposed in an exhaust of an engine. The method includes sensing a common property of both the exhaust upstream and downstream of the catalyst. Samples of such upstream and downstream sensed property are taken over a period of time. The taken samples are accumulated over the period of time. Statistical characteristics of the sensed common property of the upstream and downstream common property are determined. The determined statistical characteristics of the sensed upstream property are compared with the determined statistical characteristics of the downstream property to determine whether catalyst was in a proper operating condition during such period of time.

With such method statistical characteristics are determined from samples as they are obtained and then once obtained, processed to determine the condition of the catalyst. Such method thereby reduces memory or data storage requirements and also reduces computational requirements.

In one embodiment, the common property is oxygen content in the exhaust.

In one embodiment one of the statistical characteristics is the mean of the samples of the upstream property and the mean of the downstream property.

In one embodiment another one of the statistical characteristics is the mean of the square of the samples of the upstream property and the square of the mean of the downstream property.

In one embodiment, another one of the statistical characteristic is the variance of the samples of the upstream property and the variance of the samples of the downstream property.

In one embodiment, the variance of the samples of the upstream property is determined by calculating the average of the squares of such upstream samples minus the square of the mean of such upstream samples and wherein the variance of the samples of the downstream property is determined by calculating the average of the squares of such downstream samples minus the square of the mean of such downstream samples.

In accordance with the invention, a method is provided for determining a condition of a catalyst disposed in an exhaust of an engine. The method includes providing oxygen sensors in the exhaust upstream and downstream of the catalyst; estimating the mean value of the upstream and downstream sensor signals, $m_f$ and $m_r$ respectively, in accordance with:

$$m_f = \frac{1}{N} \sum_{t=1}^{N} v_f(t) \text{ and } m_r = \frac{1}{N} \sum_{t=1}^{N} v_r(t), \text{ respectively}$$

where $v_f(t)$ and $v_r(t)$ are the voltages of the front and rear oxygen sensor respectively at time t, and N is the number of samples over the period of time; estimating the variances and correlation coefficient, denoted by $s_f^2$, $s_r^2$, and r respectively, in accordance with:

$$s_f^2 = \frac{1}{N} \sum_{t=1}^{N} ((v_f(t))^2) - \left(\frac{1}{N} \sum_{t=1}^{N} v_f(t)\right)^2$$

$$s_r^2 = \frac{1}{N} \sum_{t=1}^{N} ((v_r(t))^2) - \left(\frac{1}{N} \sum_{t=1}^{N} v_r(t)\right)^2$$

$$r s_f s_r = \frac{1}{N} \sum_{t=1}^{N} v_f(t-T) v_r(t) - \left(\frac{1}{N} \sum_{t=1}^{N} v_f(t-T)\right)\left(\frac{1}{N} \sum_{t=1}^{N} v_r(t)\right)$$

where T is a positive constant; and determining the condition of the catalyst by comparing the differences between the estimated means of the upstream and downstream sensor signals, the difference in the estimated variances of the upstream and downstream sensor signals, and the estimated correlation coefficient.

The details of one or more embodiments of the invention are set forth in the accompanying drawings and the description below. Other features, objects, and advantages of the

DESCRIPTION OF DRAWINGS

Like reference symbols in the various drawings indicate like elements.

DETAILED DESCRIPTION

Figure 1:
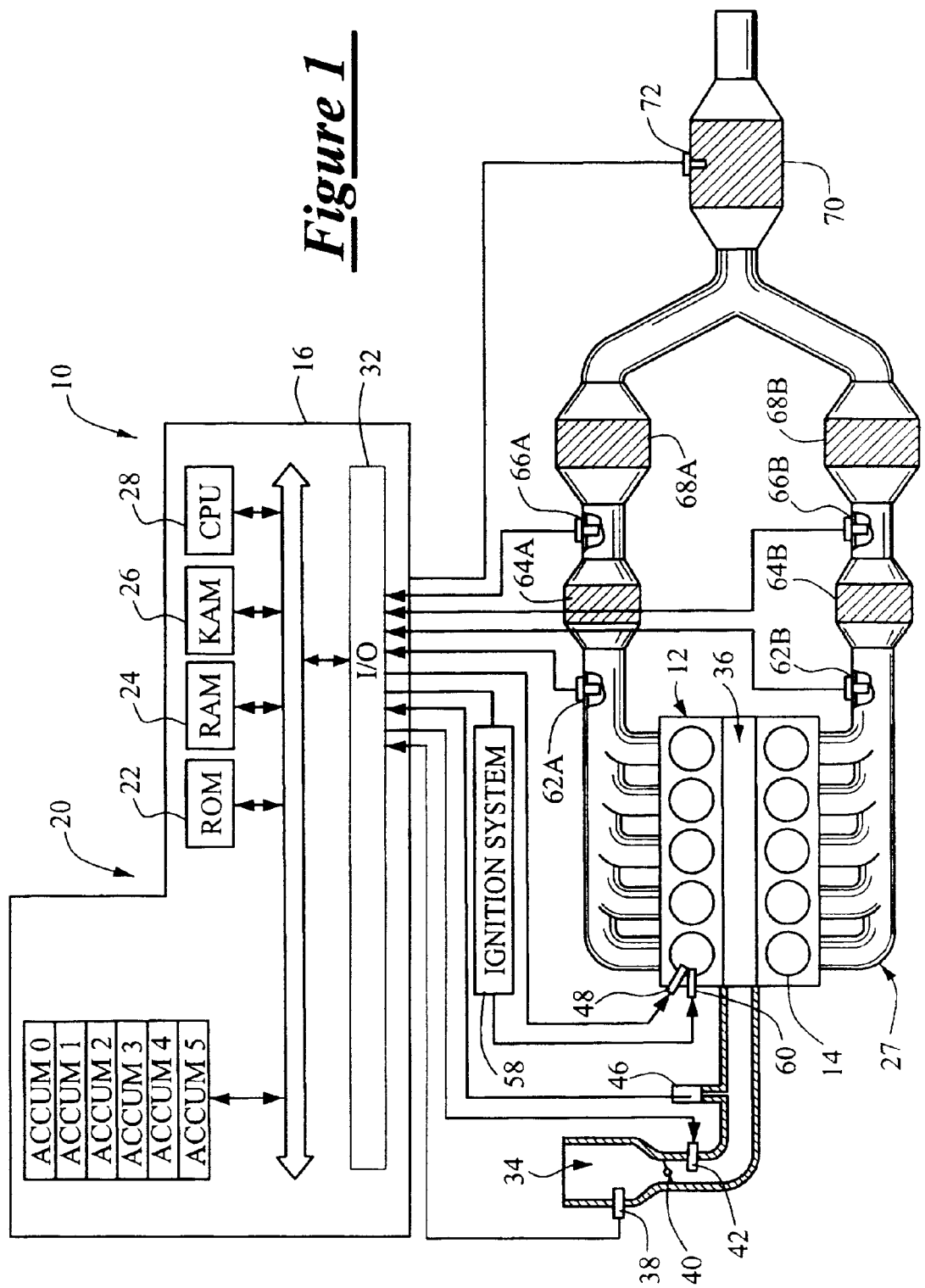
FIG. 1 is a block diagram of an engine system having a processor for determining the condition of a catalyst used in the exhaust of such engine.
Figure 2:
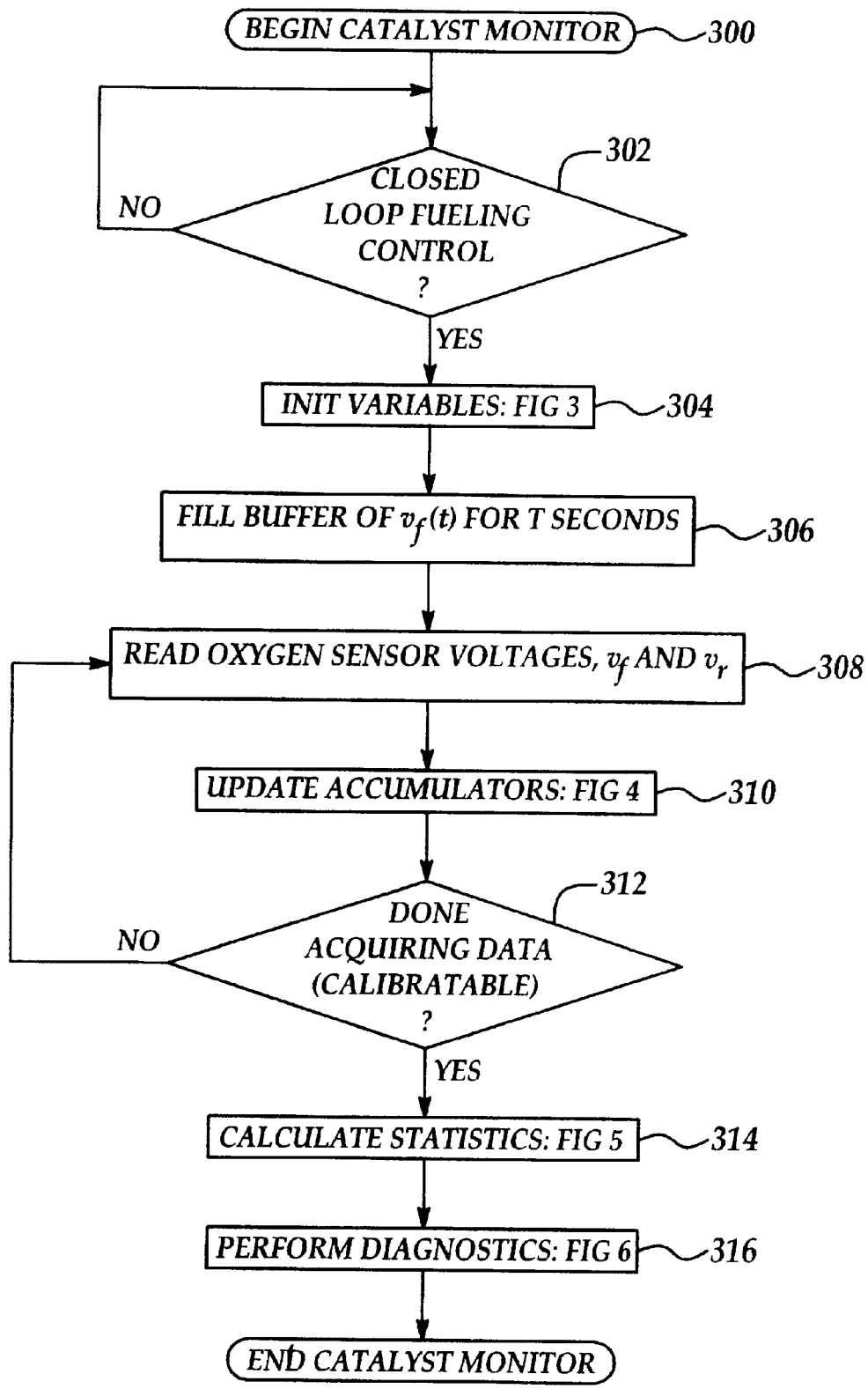
FIGS. 2–6 are flow diagrams of process used by the processor of the system of FIG. 1 to determine the condition of the catalyst.

Referring now to FIG. 1, a block diagram illustrating an engine control system 10 for a representative internal combustion engine with conditioning catalyst monitor according to one embodiment of the present invention is shown in FIG. 1. System 10 preferably includes an internal combustion engine 12 having a plurality of cylinders, represented by cylinder 14. In one preferred embodiment, engine 12 includes eight cylinders arranged in a "V" configuration having two cylinder banks with four cylinders each.

As one of ordinary skill in the art will appreciate, system 10 includes various sensors and actuators to effect control of the engine. One or more sensors or actuators may be provided for each cylinder 14, or a single sensor or actuator may be provided for the engine. For example, each cylinder 14 may include four actuators which operate corresponding intake and exhaust valves, while only including a single engine coolant temperature sensor.

System 10 preferably includes a controller 16 having a microprocessor 28 in communication with various computer-readable storage media, indicated generally by reference numeral 20. The computer readable storage media preferably include a read-only memory (ROM) 22, a random-access memory (RAM) 24, and a keep-alive memory (KAM) 26. As known by those of ordinary skill in the art, KAM 26 is used to store various operating variables while controller 16 is powered down but is connected to the vehicle battery. Computer-readable storage media 20 may be implemented using any of a number of known memory devices such as PROMs, EPROMs, EEPROMs, flash memory, or any other electric, magnetic, optical, or combination memory device capable of storing data, some of which represents executable instructions, used by microprocessor 28 in controlling the engine. Microprocessor 28 communicates with the various sensors and actuators via an input/output (I/O) interface 32. Of course, the present invention could utilize more than one physical controller, such as controller 16, to provide engine/vehicle control depending upon the particular application.

In operation, air passes through intake 34 where it may be distributed to the plurality of cylinders via an intake manifold, indicated generally by reference numeral 36. System 10 preferably includes a mass airflow sensor 38 which provides a corresponding signal (MAF) to controller 16 indicative of the mass airflow. If no mass airflow sensor is present, a mass airflow value may be inferred from various engine operating parameters. A throttle valve 40 may be used to modulate the airflow through intake 34 during certain operating modes. Throttle valve 40 is preferably electronically controlled by an appropriate actuator 42 based on a corresponding throttle position signal generated by controller 16. A throttle position sensor provides a feedback signal (TP) indicative of the actual position of throttle valve 40 to controller 16 to implement closed loop control of throttle valve 40.

As illustrated in FIG. 1, a manifold absolute pressure sensor 46 may be used to provide a signal (MAP) indicative of the manifold pressure to controller 16. Air passing through intake 34 enters the combustion chambers or cylinders 14 through appropriate control of one or more intake valves. The intake and exhaust valves may be controlled directly or indirectly by controller 16 along with ignition timing (spark) and fuel to selectively activate/deactivate one or more cylinders 12 to provide variable displacement operation. A fuel injector 48 injects an appropriate quantity of fuel in one or more injection events for the current operating mode based on a signal (FPW) generated by controller 16 processed by an appropriate driver. Control of the fuel injection events is generally based on the position of the pistons within respective cylinders 14. Position information is acquired by an appropriate crankshaft sensor which provides a position signal (PIP) indicative of crankshaft rotational position. At the appropriate time during the combustion cycle, controller 16 generates a spark signal (SA) which is processed by ignition system 58 to control spark plug 60 and initiate combustion within an associated cylinder 14.

Controller 16 (or a camshaft arrangement) controls one or more exhaust valves to exhaust the combusted air/fuel mixture of activated or running cylinders through an associated exhaust manifold, indicated generally by reference numeral 27. Depending upon the particular engine configuration, one or more exhaust manifolds may be used. In one preferred embodiment, engine 12 includes an exhaust manifold 27 associated with each bank of cylinders as illustrated in FIG. 1.

Monitoring sensors 62A and 62B are preferably associated with a bank of cylinders and provide a signal (EGO) indicative of the oxygen content of the exhaust gases to controller 16. Monitoring sensors 62A and 62B are preferably exhaust gas oxygen sensors. The present invention is independent of the particular type of exhaust gas oxygen sensor utilized, which may depend on the particular application. In one embodiment, heated exhaust gas oxygen sensors (HEGO) are used for monitoring and feedback control as described below. Of course, various other types of air/fuel ratio sensors/indicators may be used such as a universal exhaust gas oxygen sensor (UEGO), for example.

The exhaust gas passes through the exhaust manifolds 27 and through associated catalysts 64A and 64B which act as mechanical and chemical filters by straightening the exhaust gas flow and acting as catalysts for conversion of a portion of the exhaust gases. Catalysts 64A and 64B are positioned upstream relative to control exhaust gas oxygen sensors 66A and 66B, respectively. Control sensors 66A and 66B may be used during closed loop control of the air/fuel ratio during certain modes of engine operation. The filtering provided by catalysts 64A and 64B reduces the contaminants contacting control sensors 66A and 66B.

According to one embodiment of the present invention, signals from monitoring sensor 62A and control sensor 66A are sampled at a predetermined interval and adjusted to reduce the effect of any difference in signal amplitudes and mean values on a subsequent comparison of the signals. The adjusted signals are then compared to determine operational efficiency of the conditioning catalyst based on the relative similarity or differences between the signal shapes. As the conversion efficiency of conditioning catalyst 64A decreases, the adjusted signal shapes become similar provided the time delay between sensors is considered. The relative similarity or difference between signal shapes may be determined using a correlation coefficient, for example, as illustrated and described below and in the above-referenced co-pending patent application, the entire subject matter thereof being incorporated into this patent application by reference.

After passing through conditioning catalysts 64A and 66B, exhaust gases flow through an associated close-coupled catalyst 68A, 68b, respectively, and are combined prior to flowing through a main underbody catalyst 70.

A temperature sensor 72 may be provided to monitor the temperature of a catalyst within emission control device or underbody catalyst 70, depending upon the particular application. Alternatively, the temperature may be estimated using an appropriate temperature model based on various other sensed engine/vehicle parameters which may include mass airflow, manifold absolute pressure or load, engine speed, air temperature, engine coolant temperature, and/or engine oil temperature, for example. A representative temperature model could be developed to determine catalyst temperature for any one of the emission control devices 64A, 64B, 68A, 68B and/or 70 using various sensed and estimated engine operating parameters as described in U.S. Pat. No. 5,956,941, for example.

It should first be noted that catalyst 64A is monitored in response to signals from upstream and downstream sensors 62A and 66A, respectively, in the same manner in which catalyst 64B is monitored in response to signals from upstream and downstream sensors 62B and 66B, respectively. Thus, we will consider the signals from sensors 62A and 66A in evaluating the condition of catalyst 64A, understanding the processing of signals from sensors 62B and 66B is the same to thereby indicated the condition of catalyst 64B. Thus, as noted above, the two sensors 62A, 66A, one upstream and one downstream of the catalyst 64A, detect the oxygen concentration in the exhaust passing through such catalyst 64A. When the engine operates in closed loop fuel control, the upstream concentration of oxygen oscillates around stoichiometry, but due to the oxygen storage of the catalyst, the downstream concentration has a different time history.

These differences are quantified based on the first and second order statistics of the two signals, produced by the upstream sensor, or front 62A and the downstream or rear sensor 66B, respectively. In other words, the mean value and variance of each signal are computed by the processor 16, along with the correlation coefficient between them. The diagnostic decision uses all five of these statistical quantities. If the two signals have the same mean value, and the same variance, then they are quite similar. If in addition the correlation coefficient is near +1, then the two signals are statistically the same to an engineering approximation. If the pre- and post-catalyst oxygen sensor signals are the same then the oxygen storage of the catalyst 64A is depleted, and the conversion efficiency is degraded. The calculation methodology is efficient from both a computational and memory standpoint. Furthermore, a key computational issue is solved by a novel application of statistical identities to be described.

More particularly, in accordance with the invention, several novel features allowing diagnosis of a TWC, here catalyst 64A. Because this algorithm is based on a detailed statistical analysis of the sensor signals, highly accurate decisions can be made, a critical feature at the SULEV/PZEV emissions standards. Furthermore, a simple computer, here processor 16, can execute the algorithm quickly due to the modest computational and memory requirements.

Computing Statistical Quantities

The mean value of the front and rear sensor signals, $m_f$ and $m_r$ respectively, (i.e., the mean of the signals produced by the sensors 62A and 66A, respectively) are estimated by the well-known expressions given in Equation 1 and Equation 2.

$$m_f = \frac{1}{N}\sum_{t=1}^{N} v_f(t) \qquad \text{Equation 1}$$

$$m_r = \frac{1}{N}\sum_{t=1}^{N} v_r(t) \qquad \text{Equation 2}$$

where $v_f(t)$ and $v_r(t)$ are the voltages of the front and rear oxygen sensors 62A and 66A, respectively at time t, and N is the number of samples. The following notion is used:

| | |
|---|---|
| $s_f$, ($s_r$) | Standard deviation of the front (rear) HEGO voltage |
| $s_f^2$, ($s_r^2$) | Variance of the front (rear) HEGO voltage |
| R | Correlation coefficient between front and rear HEGO voltages |

Ignoring some theoretical subtleties, the variances and correlation coefficient, denoted by $s_f^2$, $s_r^2$, and r respectively, are usually estimated by Equation 3, Equation 4, and Equation 5.

$$s_f^2 = \frac{1}{N}\sum_{i=1}^{N}(v_f(i)-m_f)^2 \qquad \text{Equation 3}$$

$$s_r^2 = \frac{1}{N}\sum_{i=1}^{N}(v_r(i)-m_r)^2 \qquad \text{Equation 4}$$

$$rs_f s_r = \frac{1}{N}\sum_{i=1}^{N}(v_r(i)-m_r)(v_f(i)-m_f) \qquad \text{Equation 5}$$

Using this method to calculate the variances and correlation coefficient, however, creates a problem for implementation in the engine control computer, here processor 16. To execute these calculations, the mean value must already have been determined, but the mean value is not known until all the data has been collected. Therefore, implementing these equations as given would require storing all the past voltages from both oxygen sensors. Once all the data is collected, the mean value can be estimated, and the variances can be estimated. If these sensors are sampled at 20 Hz in some applications, storing all these values would require about 50 kilobytes of RAM, an unreasonable requirement.

This invention includes a novel method to avoid the storage requirement. One key idea behind this calculation is the following identity:

$$s_f^2 = \frac{1}{N}\sum_{t=1}^{N}(v_f(t)^2 - 2v_f(t)m_f + m_f^2) =$$ Equation 6

$$\frac{1}{N}\sum_{t=1}^{N}((v_f(t))^2) - \left(\frac{1}{N}\sum_{t=1}^{N}v_f(t)\right)^2$$

This form of the equation shows that the variance of the data is equal to the average of the squares of the data minus the square of the average. By using this equation, each data point can be processed as it is acquired. Instead of requiring N memory registers to store all samples of the data, only four memory registers (i.e., accumulators) are required in the processor 16: one, ACCUM1, to accumulate the sum of the voltage $v_f(t)$, one, ACCUM2, to accumulate the sum of the voltages $v_r(t)$, one, ACCUM3, to accumulate the sum of the squares of the voltage $V_f(t)$ and one, ACCUM4, to accumulate the sum of the squares of the voltage $v_r(t)$.

Another expansion, parallel to Equation 6, exists for $s_r^2$. The product $rs_fs_r$, is expanded as shown in Equation 7.

$$rs_fs_r = \frac{1}{N}\sum_{t=1}^{N}v_f(t)v_r(t) - \left(\frac{1}{N}\sum_{t=1}^{N}v_f(t)\right)\left(\frac{1}{N}\sum_{t=1}^{N}v_r(t)\right)$$ Equation 7

Thus, fifth accumulator ACCUM5 is provided in processor 16 to store the products $V_f(t)*V_r(t)$ as measurements from the oxygen sensors 62A, 66A are made. As will be described in more detail below in connection with FIGS. 2 through 6, the values (i.e., the samples from the sensors 62A and 66A) can be immediately processed and intermediate values stored in the accumulators ACCUM1–ACCUM5 within the processor 16. Once all the data has been collected, the mean values have been computed, and the variances have been computed, then Equation 7 can be solved for r.

Finally, it should be noted that a sixth accumulator ACCUM0 is used to keep track of the number of samples taken and thus stores N.

Time Delay and Oxygen Storage

The signals of the two oxygen sensors 62A, 66A have a time delay between them. This time delay arises from two sources: the time it takes the exhaust gases to travel from the first sensor 62A to the second sensor 66A and the oxygen storage capacity of the catalyst 64A. As the oxygen storage degrades, the time delay shrinks. Likewise, as the speed and load of the engine change, the time delay shrinks. While the mean values and variances are insensitive to the time delay between the signals, the correlation coefficient is a strong function of the delay. The correlation coefficient as shown in Equation Equation 5 and Equation 7 is calculated with a time delay of zero; in these equations the processed voltages are both from the same time instant. Another alternative is to perform the correlation calculation at many different time delays and then use the maximum value of the correlation. Such a calculation, however, would require extensive computation and memory.

A third alternative is to set a fixed time delay off-line: find the time delay corresponding to a threshold catalyst system and calibrate this as a constant delay, T, for all calculations. Many methods exist to determine an appropriate value for T. In one embodiment a catalyst which has borderline emissions effectiveness is provided. This catalyst is then inserted between two oxygen sensors. A step change in the oxygen content of the exhaust, or a step change in air/fuel ratio, injected at the input of the upstream sensor. The length of time it takes for the step change to occur in the downstream sensor is the above-mentioned time delay T.

Using a constant value for T is shown mathematically in Equation 8 below. To eliminate the influence of speed and load on the time delay, the monitor should be run at specified speed load points such that either the impact is averaged out or this portion of the time delay is constant. In addition to reducing the computation time and memory requirements, selecting a fixed time delay in this embodiment improves the sensitivity of the correlation analysis. The improved accuracy arises from the fact that a fresh catalyst system is correlated using the time delay for a threshold system. The "wrong" time delay is used, and the resulting correlation coefficient is not the maximum possible for those two signals. As the catalyst ages, the actual time delay approaches the calibrated time delay, while simultaneously the shapes of the two signals become more similar. Both of these trends cause the correlation coefficient to increase. This single calibrated time delay is a key feature of this correlation method described in the above-referenced co-pending patent application $$rs_fs_r = \frac{1}{N}\sum_{t=1}^{N}v_f(t-T)v_r(t) - \left(\frac{1}{N}\sum_{t=1}^{N}v_f(t-T)\right)\left(\frac{1}{N}\sum_{t=1}^{N}v_r(t)\right)$$ Equation 8

Using a pre-calculated time delay, T, requires a simple FIFO buffer memory in the KAM 24 to keep track of old values of one signal. If the sample rate is 20 Hz, then the buffer must hold 20T samples. Typically, T is around 2 seconds.

Diagnosis Using Statistical Quantities

In general, these five statistical quantities measure different aspects of two signals, here the two signals produced by the sensors 62A and 66A. If the two signals share the same mean value and the same variance, they are quite similar. If in addition the correlation coefficient between the two is near unity, then the two signals are nearly the same, statistically speaking. If the oxygen sensors 62A and 66A see the same signal, the oxygen storage capacity of the catalyst 64A is depleted, and the conversion efficiency of the catalyst is low.

The most important quantity for diagnosis is the correlation coefficient, r. This number measures the similarity of the two waveforms. If the catalyst has large oxygen storage, then the rear oxygen sensor 66A does not see the same oxygen concentration as the front sensor 62A; the two sensor signals will have different shapes. If the catalyst 64A has less oxygen storage, more "break-through" occurs and the two sensors 62A and 66A see more similar concentrations of oxygen; in this case the two signals have similar shape. Furthermore, the correlation coefficient is highly sensitive to the time delay or phase lag between the two signals, and this time delay is also a strong function of the oxygen storage in the catalyst. Therefore, a low correlation indicates a fresh catalyst, while a high correlation indicates a degraded catalyst.

The diagnostic rules flow from an understanding of these interpretations, as well as an understanding of how the fueling strategy functions. In general, these five statistical quantities measure different aspects of two signals, here the two signals produced by the sensors 62A and 66A. If the two signals share the same mean value and the same variance, they are quite similar. If in addition the correlation coefficient between the two is near unity, then the two signals are nearly the same, statistically speaking. If the oxygen sensors 62A and 66A see the same signal, the oxygen storage capacity of the catalyst 64A is depleted, and the conversion efficiency of the catalyst is low.

TABLE 1

Interpretation of Statistical Quantities

| Statistical Quantity | Meaning |
|---|---|
| Mean, $m_f$ and $m_r$ | Average value of the signal |
| Variance, $s_f$ and $s_r$ | Gives a measure of the average amplitude or spread of the signal, RMS value |
| Correlation Coefficient, r | Compares "shapes" while ignoring mean value and amplitude, bounded between +1 and −1 |

While the correlation coefficient lies at the heart of catalyst diagnostics, the other four quantities, mean values and variances, also provide information about the system. The variances provide a check against a possible failure of the correlation coefficient. The correlation coefficient ignores amplitudes and mean values and only compares shapes. Therefore, small amplitude of the upstream oxygen sensor signal with shape similar to the control HEGO signal would falsely indicate a failed catalyst. By comparing the variances and mean values of the signals, however, this case can be easily detected. Since the variance of a signal is a measure of its amplitude, catalyst failure should only be declared when the variance of the front and rear sensors are roughly equal. Requiring the mean values to be equal adds further robustness.

This logic is summarized in Table 2 below. By utilizing all five pieces of information about the signals, the catalyst diagnosis is more accurate and robust than if only a single piece of information is used. While Table 2 indicates that the checks are made against unity, clearly this number can be a calibrated constant.

TABLE 2

Diagnostic Inference Table for Catalyst

| Statistical Quantities | Inferred Catalyst Condition |
|---|---|
| (r = 1) and ($s_r/s_f$ = 1) and ($m_r = m_f$) | Catalyst Failed |
| (r small) or ($s_r/s_f$ small) or ($m_r \neq m_f$) | Catalyst OK, other failure possible |

This method of monitoring TWCs can be used for a variety of different applications, including the daunting task of monitoring a TWC at PZEV levels. Other applications for this technology include: low oxygen storage catalysts; lean burn applications; ACCRO (zoned catalysts); and LEVII $NO_x$ monitoring, for example.

Figure 3:
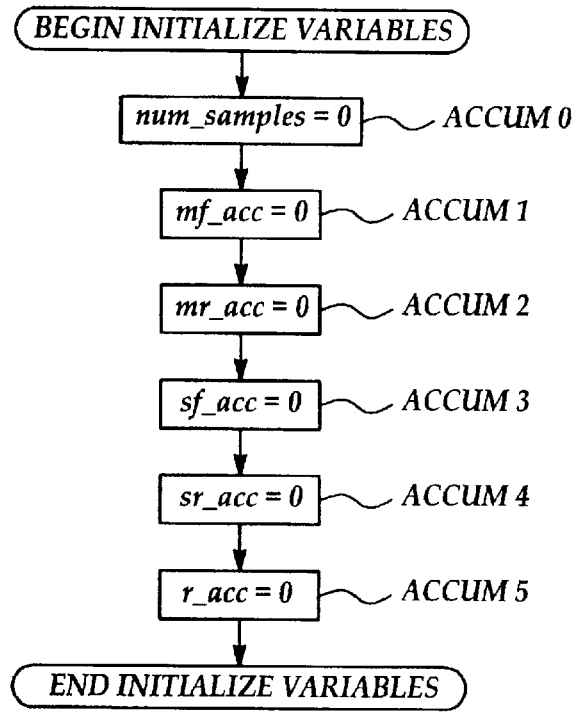
Figure 4:
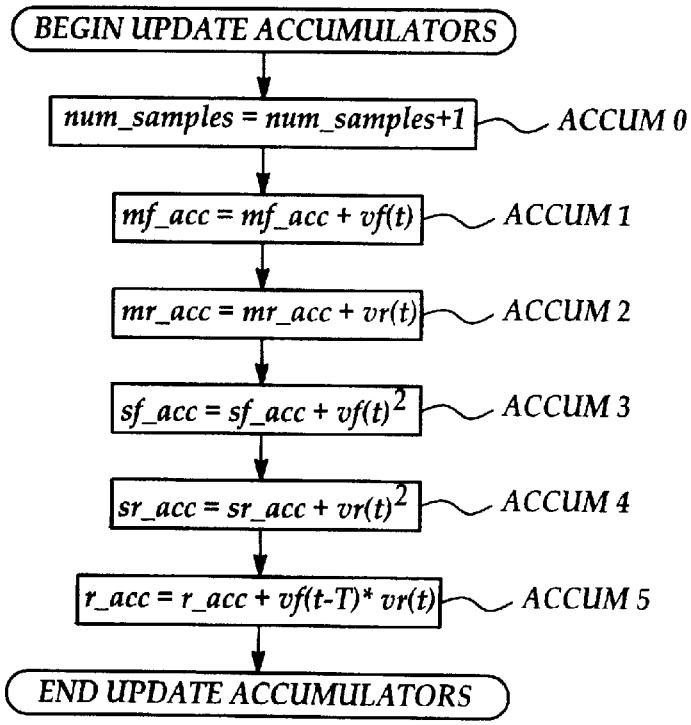

Referring now to FIGS. 2 through 6 flow diagrams are shown which execute code stored in the processor 16. Thus, referring to FIG. 2, the catalyst monitor begins at 300. When the closed loop fuelling is being controlled, i.e., 302, the upstream concentration of oxygen, as monitored by sensor 62A (FIG. 1) oscillates around stoichiometry. Once operating around stoichiometry, variable in the process are initialized in Step 304 as shown in FIG. 3. i.e., the accumulators ACCUM0–ACCUM5 for the mean, standard deviation and correlation are set to zero. In Step 306 samples of $V_f(t)$ are stored for T second (T is the same as the above-described time delay T.) In Step 308, the sensor voltages $V_f$ and $V_r$ are sampled. The sampled voltages $V_f(t)$ and $V_r(t)$ are fed to accumulators ACCUM1 and ACCUM2, respectively as shown in FIG. 4. The sampled voltages $V_f(t)$ and $V_r(t)$ are each squared to form $V_f(t)^2$ and $V_r(t)^2$, respectively, and such squared voltages $V_f(t)^2$ and $V_r(t)^2$ are fed to accumulators ACCUM3 and ACCUM4, respectively as shown in FIG. 4. Further, the product of the sampled voltages $V_f(t-T)$, taken from the FIFO buffer in KAM 24, and $V_r(t)$ (i.e., $V_f(t-T)*V_r(t)$ are fed to ACCUM5, as shown in FIG. 4.

Figure 5:
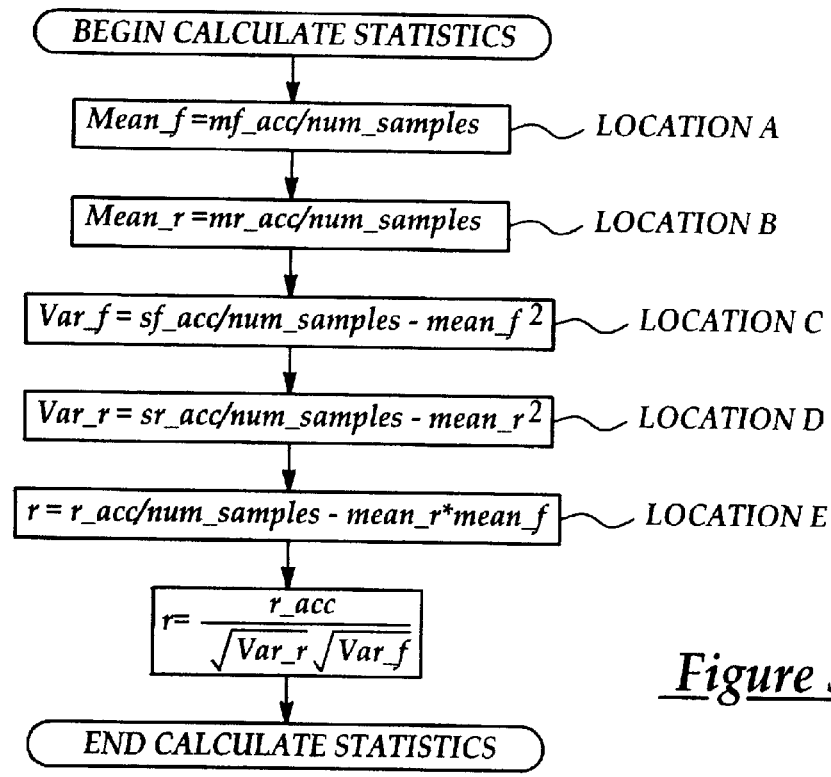

Once the accumulation is performed for the T the predetermined number of samples N (Step 312), the statistics described above in connection with Equations 6 and 7 are performed by the processor 16 (Step 314), as shown in FIG. 5. The number of samples can be chosen by many methods. In this embodiment, for example, the number of samples, N, is selected to ensure acceptable estimates of all quantities. That is, after this data acquisition process (Step 312), the statistics are calculated in accordance with the equations presented above (Step 314). Thus, reference is made to FIG. 5. As shown therein, the accumulated voltage in ACCUM1 is divided by the number of samples and the result is stored in the RAM 24 (FIG. 1) at a specified location herein designated as location A. Thus, location A stores the mean of Vf(t), $m_f$, as shown in FIG. 5.

The accumulated voltage in ACCUM2 is divided by the number of samples (i.e., N stored in ACCUM0) and the result is stored in the RAM 24 (FIG. 1) at a specified location herein designated as location B. Thus, location B stores the mean of Vr(t), $m_r$, as shown in FIG. 5.

The accumulated voltage in ACCUM3 is divided by the number of samples and this has subtracted from it the square of the value at location A of RAM 24 (i.e., $m_f^2$). The result is the variance of Vf(t), i.e., $S_f$. The result $S_f$ is stored in the RAM 24 (FIG. 1) at a specified location herein designated as location C, as shown in FIG. 5.

The accumulated voltage in ACCUM4 is divided by the number of samples and this has subtracted from it the square of the value at location B of RAM 24 (i.e., $m_r^2$). The result is the variance of Vr(t), i.e., $S_r$. The result $S_r$ is stored in the RAM 24 (FIG. 1) at a specified location herein designated as location D, as shown in FIG. 5.

The accumulated voltage in ACCUM5 is divided by the number of samples and this has subtracted from it the product of the value stored in location A of RAM 24 (i.e., $m_f$) and the value stored in location B of RAM 24 (i.e., $m_r$) to thereby form $rS_fS_r$ in accordance with Equation 8 above, i.e., the square of the value at location B of RAM 24 (i.e., $m_r^2$). The result, $rS_fS_r$ is stored in RAM 24 at location E.

To determine r, the result $rS_fS_r$ stored in location E is divided by the square root of the product of the data, $S_f$, stored in location C and the data, $S_r$, stored in location D.

Figure 6:
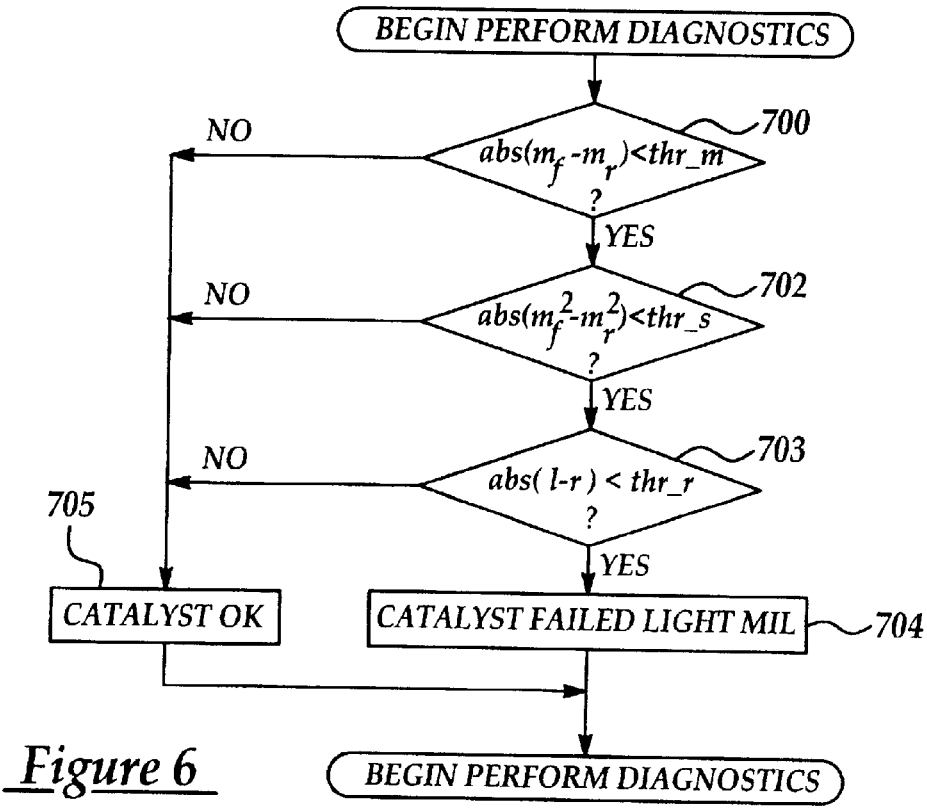

Having the statistics from Step 314, the diagnosis described above in Table 2 are performed in Step 316 as shown in FIG. 6. Thus, in Step 700 a determination is made whether the difference in the mean of $V_f(t)$ and the mean of $V(t)_r$ is less than some a priori established threshold thr__m. If greater than the threshold the catalyst is determined to be OK (Step 705); otherwise a test is made in Step 702 to determine if the difference in the variances of Vf(t) and $V(t)_f$ is less than some predetermined threshold, thr__s. If the difference is greater than the threshold the catalyst is determined to be OK (Step 705); if not, the deviation of the correlation coefficient r between the front sensor 62A $V_f(t)$ and rear sensor 66A from 1 is compared with a predetermined threshold thr_r (Step 703). If it is greater than this threshold the catalyst is OK (Step 705); otherwise, the operator of the vehicle is advised that the catalyst has failed (Step 704).

A number of embodiments of the invention have been described. Nevertheless, it will be understood that various modifications may be made without departing from the spirit and scope of the invention. Accordingly, other embodiments are within the scope of the following claims.

What is claimed is:

1. The method for determining a condition of a catalyst disposed in an exhaust of an engine, comprising:
   (A) sensing a common property of both the exhaust upstream and downstream of the catalyst;
   (B) taking samples of such upstream and downstream sensed property over a period of time;
   (C) accumulating the samples over the period of time;
   (D) determining statistical characteristics of the sensed common property of the upstream and downstream common property;
      (i) wherein one of the statistical characteristics is the mean of the samples of the upstream property and the mean of the downstream property; and
      (ii) wherein another one of the statistical characteristics is the mean of the square of the samples of the upstream property and the square of the mean of the downstream property, and
   (E) comparing the determined statistical characteristics of the sensed upstream property with the determined statistical characteristics of the downstream property to determine whether catalyst was in a proper operating condition during such period of time.

2. The method recited in claim 1 wherein the common property is oxygen content in the exhaust.

3. The method recited in claim 1 wherein another one of the statistical characteristic is the variance of the samples of the upstream property and the variance of the samples of the downstream property.

4. The method recited in claim 3 wherein the variance of the samples of the upstream property is determined by calculating the average of the squares of such upstream samples minus the square of the mean of such upstream samples and wherein the variance of the samples of the downstream property is determined by calculating the average of the squares of such downstream samples minus the square of the mean of such downstream samples.

5. A method for determining a condition of a catalyst disposed in an exhaust of an engine, comprising:
   providing oxygen sensors in the exhaust upstream and downstream of the catalyst;
   estimating the mean value of the upstream and downstream sensor signals, $m_f$ and $m_r$ respectively, in accordance with:

$$m_f = \frac{1}{N}\sum_{t=1}^{N} v_f(t) \text{ and } m_r = \frac{1}{N}\sum_{t=1}^{N} v_r(t), \text{ respectively}$$

where $v_f(t)$ and $v_r(t)$ are the voltages of the front and rear oxygen sensor respectively at time t, and N is the number of samples over the period of time;
   estimating the variances and correlation coefficient, denoted by $s_f^2$, $s_r^2$, and r respectively, in accordance with:

$$s_f^2 = \frac{1}{N}\sum_{t=1}^{N}(v_f(t)^2) - \left(\frac{1}{N}\sum_{t=1}^{N}v_f(t)\right)^2$$

$$s_r^2 = \frac{1}{N}\sum_{t=1}^{N}(v_r(t)^2) - \left(\frac{1}{N}\sum_{t=1}^{N}v_r(t)\right)^2 \text{ or}$$

$$rs_f s_r = \frac{1}{N}\sum_{t=1}^{N} v_f(t-T)v_r(t) - \left(\frac{1}{N}\sum_{t=1}^{N}v_f(t-T)\right)\left(\frac{1}{N}\sum_{t=1}^{N}v_r(t)\right)$$

where T is a positive constant; and
   determining the condition of the catalyst by comparing the differences between the estimated means of the upstream and downstream sensor signals, the difference in the estimated variances of the upstream and downstream sensor signals, and the estimated correlation coefficient.

* * * * *